(12) United States Patent
Kong et al.

(10) Patent No.: US 11,907,440 B2
(45) Date of Patent: Feb. 20, 2024

(54) SCHEME CAPABLE OF DYNAMICALLY ADJUSTING SENSOR FRAME RATE ACCORDING TO POLLING RATE OF MICROCONTROLLER TO AVOID INVALID DISPLACEMENT DATA REPORT AND TO SAVE MORE POWER

(71) Applicant: PixArt Imaging Inc., Hsin-Chu (TW)

(72) Inventors: Shang Chan Kong, Penang (MY); Chun Heap Leow, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 167 days.

(21) Appl. No.: 17/571,547

(22) Filed: Jan. 10, 2022

(65) Prior Publication Data

US 2023/0221806 A1    Jul. 13, 2023

(51) Int. Cl.
  *G06F 3/03*     (2006.01)
  *H04L 41/0823*  (2022.01)
  *H04L 41/0813*  (2022.01)

(52) U.S. Cl.
  CPC ........ *G06F 3/0304* (2013.01); *H04L 41/0813* (2013.01); *H04L 41/0823* (2013.01)

(58) Field of Classification Search
  None
  See application file for complete search history.

(56) References Cited

U.S. PATENT DOCUMENTS

| | | | |
|---|---|---|---|
| 10,929,701 B1* | 2/2021 | Tan | G06F 3/0317 |
| 2014/0300548 A1* | 10/2014 | Lye | G06F 3/03543 345/163 |
| 2019/0033992 A1* | 1/2019 | Morier | G06F 3/0304 |
| 2021/0271334 A1* | 9/2021 | Lye | H03K 21/08 |

* cited by examiner

*Primary Examiner* — Amare Mengistu
*Assistant Examiner* — Sarvesh J Nadkarni
(74) *Attorney, Agent, or Firm* — Winston Hsu (57) ABSTRACT

A method of a navigation sensor circuit includes: monitoring at least one polling request signal sent from a microcontroller during a variable time interval, wherein the microcontroller is externally coupled to the navigation sensor circuit; calculating at least one polling rate of the microcontroller according to the at least one polling request signal; and dynamically adjusting a sensor frame rate of the navigation sensor circuit according the at least one polling rate, wherein an image sensor of the navigation sensor circuit operates and captures images to generate and output displacement data based on the sensor frame rate.

14 Claims, 5 Drawing Sheets

SCHEME CAPABLE OF DYNAMICALLY ADJUSTING SENSOR FRAME RATE ACCORDING TO POLLING RATE OF MICROCONTROLLER TO AVOID INVALID DISPLACEMENT DATA REPORT AND TO SAVE MORE POWER

BACKGROUND OF THE INVENTION

1. Field of the Invention

The invention relates to a navigation sensor scheme, and more particularly to a navigation sensor circuit and a corresponding method.

2. Description of the Prior Art

Generally speaking, a conventional optical mouse device may have a microcontroller (MCU) and an image sensor, and the MCU may periodically poll the image sensor to make the image sensor periodically return one displacement data signal. However, the MCU's polling rate actually may have deviations, and thus the image sensor may report more displacement signals during the time interval between two consecutive polling request events; that is, some displacement signal(s) may be invalid.

SUMMARY OF THE INVENTION

Therefore one of the objectives of the invention is to provide a navigation sensor circuit and a corresponding method, to solve the above-mentioned problems.

According to embodiments of the invention, a method of a navigation sensor circuit is disclosed. The method comprises: monitoring at least one polling request signal sent from a microcontroller during a variable time interval, wherein the microcontroller is externally coupled to the navigation sensor circuit; calculating at least one polling rate of the microcontroller according to the at least one polling request signal; and dynamically adjusting a sensor frame rate of the navigation sensor circuit according the at least one polling rate, wherein an image sensor of the navigation sensor circuit operates and captures images to generate and output displacement data based on the sensor frame rate.

According to the embodiments, a navigation sensor circuit to be externally coupled to a microcontroller is disclosed. The circuit comprises an image sensor and a control circuit. The image sensor is arranged for operating and capturing images to generate and output displacement data based on a sensor frame rate. The control circuit is coupled to the image sensor and the specific counter, and it is used for: monitoring at least one polling request signal sent from the microcontroller during a variable time interval; calculating at least one polling rate of the microcontroller according to the at least one polling request signal; and dynamically adjusting the sensor frame rate according the at least one polling rate.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution capable of tracking the MCU's polling rate to instantly or dynamically adjust the sensor frame rate of an image sensor so that the displacement data signals, generated and reported by the image sensor, are valid signals for the MCU. The provided technical solution is arranged to make the image sensor generate and report only one displacement data signal during a time interval between two consecutive polling request events as far as possible even though the MCU's polling rate may be significantly varied. In a preferred embodiment, no displacement data signals of the image sensor are invalid for the MCU.

Figure 1:
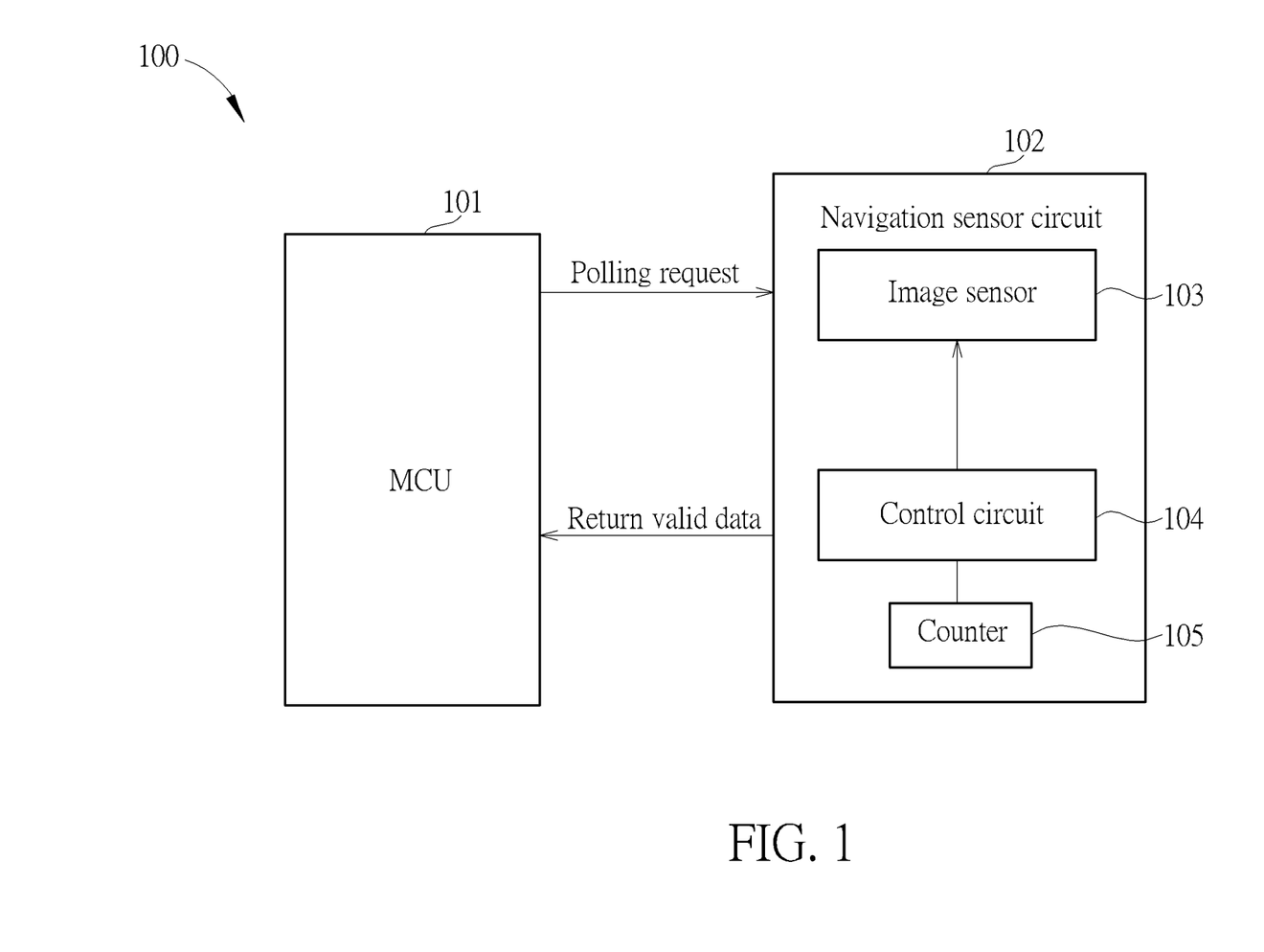
FIG. 1 is a block diagram of a navigation sensor circuit according to an embodiment of the invention.

FIG. 1 is a block diagram of a navigation sensor circuit 102 according to an embodiment of the invention. The navigation sensor circuit 102 for example is a mouse sensor and is externally coupled to a microcontroller (MCU) 101, and it comprises an image sensor 103, a control circuit 104, and a specific counter 105. For example, the navigation sensor circuit 102 may be used with the MCU 101 to form an optical mouse device 100 (but not limited).

The image sensor 103 operates and captures images to generate/output displacement data (or frame data) signals based on a variable or adjusted sensor frame rate (or can be referred to as sensor operating rate). The variable or adjusted sensor frame rate can be dynamically controlled or adjusted by the control circuit 104. For example, the time length of the variable time interval may become shorter when the at least one polling rate becomes higher, so that the control circuit 104 may be able to adjust the sensor frame rate at an earlier timing when the polling rate becomes higher or faster. In other embodiments, the time length of the variable time interval is proportional to a programmable threshold, and the specific counter 105 is started by the control circuit 104 to count a number of signal receptions of the at least one polling request signal and is reset by the control circuit when a counting number of the specific counter is higher than the programmable threshold.

The MCU 101 is arranged to periodically send the polling request signals to the navigation sensor circuit 102, and a polling request signal is used to make the navigation sensor circuit 102 report one displacement/frame data signal to the MCU 101. For example, ideally the MCU 101 may poll the navigation sensor circuit 102 with a specified or negotiated polling rate such as 1 KHz, i.e. ideally polling the circuit 102 every 1000 μs (at 1000 μs); however, this is not intended to be a limitation.

Actually, the polling rate may have signal deviations, and thus the MCU 101 may poll the circuit 102 at different time periods/intervals in different conditions. For instance, if the polling rate has one percent of deviation, then the MCU 101 may poll the circuit 102 at a longer time period such as 1010 μs or at a shorter time period such as 990 μs, in different conditions. The errors of different time periods may be accumulated so that two or more displacement data signals may be reported between the events of two consecutive polling request signals of the MCU 101, and thus a portion of reported displacement data signal will become invalid.

To solve this problem, the navigation sensor circuit 102 can track the polling rate of the MCU 101 and dynamically adjust its sensor frame rate in response to the change of the polling rate, so that the navigation sensor circuit 102 can generate and report only one displacement/frame data signal (i.e. report/return valid displacement data) to the MCU 101 as far as possible even though the actual polling rate of MCU 101 may have signal deviations.

In practice, the control circuit 104 monitors at least one polling request signal sent from the MCU 101 during a variable time interval, calculates at least one polling rate of the MCU 101 according to the at least one polling request signal, and dynamically adjusts the sensor frame rate according to the at least one polling rate. For example, the control circuit 104 can instantly or dynamically adjust such sensor frame rate according to different operation conditions which may be associated with polling request signal(s) transmitted from the MCU 101 and the minimum requirement of the MCU's 101 polling events. For example, the control circuit 104 can instantly adjust the sensor frame rate from a currently used frame rate to a higher frame rate to make the sensor frame rate be higher than the at least one polling rate when the at least one polling rate becomes higher than the currently used frame rate. Alternatively, in other embodiments, the control circuit 104 may adjust the sensor frame rate from a currently used frame rate to a lower frame rate which is lower than the currently used frame rate and higher than the at least one polling rate when the counting number of the specific counter 105 is higher than the programmable threshold. In this situation, the control circuit 104 does not adjust the sensor frame rate when the counting number is not higher than the programmable threshold.

Alternatively, in other embodiments, the control circuit 104 may maintain the sensor frame rate when both events of the sensor frame rate being higher than the at least one polling rate and a difference between the sensor frame rate and the at least one polling rate being smaller than a specific threshold. In other embodiments, the control circuit 104 may adjust the sensor frame rate by configuring the sensor frame rate as a maximum (fastest) polling rate among the at least one polling rate when the counting number of the specific counter 105 becomes higher than the programmable threshold; however, this is not intended to be a limitation. The sensor frame rate may be configured as the last polling rate which has been calculated or as the second fastest polling rate (not limited). In other embodiments, the control circuit 104 may determine whether to decrease or maintain the sensor frame rate only when the variable time interval ends.

Figure 2:
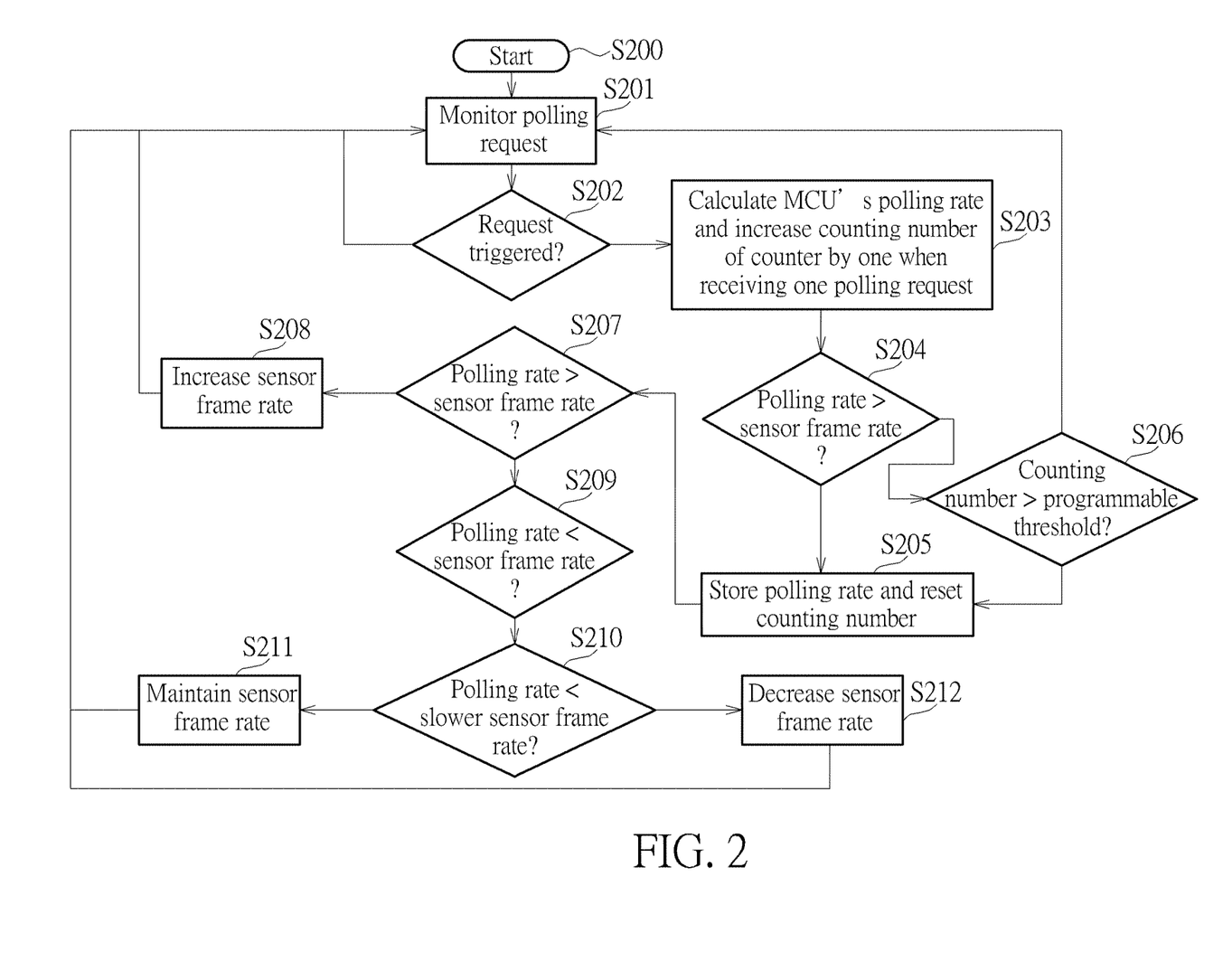
FIG. 2 is a flowchart of operations of the navigation sensor circuit (or control circuit) as shown in FIG. 1 according to an embodiment of the invention.

FIG. 2 is a flowchart of operations of the control circuit 104 as shown in FIG. 1 according to an embodiment of the invention. Provided that substantially the same result is achieved, the steps of the flowchart shown in FIG. 2 need not be in the exact order shown and need not be contiguous, that is, other steps can be intermediate. Steps are detailed in the following:

Step S200: Start;

Step S201: Monitors the polling request signal(s) transmitted from the external MCU 101;

Step S202: Determines whether the external MCU's 101 request is triggered; if yes, the flow proceeds to Step S203, otherwise, the flow goes back to Step S201;

Step S203: Calculates the polling rate of the MCU 101 and increases the number of the counter 105 by one when receiving one polling request signal from the MCU;

Step S204: Determines whether the calculated polling rate is higher than the sensor frame rate; if the calculated polling rate is higher than the sensor frame rate, the flow proceeds to Step S205, otherwise, the flow proceeds to Step S206;

Step S205: Stores the calculated polling rate and reset the number of the counter 105 as zero;

Step S206: Determines whether the number of the counter 105 is higher than a programmable threshold; if the number is higher than the programmable threshold, the flow proceeds to Step S205, otherwise, the flow proceeds to Step S201;

Step S207: Determines whether the polling rate is higher than the sensor frame rate; if the calculated polling rate is higher than the sensor frame rate, the flow proceeds to step S208, otherwise, the flow proceeds to Step S209;

Step S208: Increases the sensor frame rate;

Step S209: Determines whether the calculated polling rate is lower than the sensor frame rate; if the polling rate is higher than the sensor frame rate, the flow proceeds to Step S210, otherwise, the flow proceeds to Step S211;

Step S210: Determines whether the calculated polling rate is lower than a slower sensor frame rate used in a next round (i.e. a slower next level frame rate); if the polling rate is lower than the slower sensor frame rate, the flow proceeds to Step S212, otherwise, the flow proceeds to Step S211;

Step S211: Maintains the currently used sensor frame/operating rate; and

Step S212: Decreases the sensor frame/operating rate.

In Step S201, the control circuit 104 (or the navigation sensor circuit 102) is arranged to monitor or detect the signal reception of polling request signal(s) sent from the external MCU 101. In Step S202, the control circuit 104 determines whether the event of receiving a polling request signal from the external MCU 101 is triggered. If the event is not triggered, then the control circuit 104 in Step S201 is arranged to continuously monitor the event. If the event is triggered, then the control circuit 104 in Step S203 is arranged to calculate a polling rate of the MCU 101 and also increase (or increment) the number of the specific counter 105 by one each time when the event is triggered. The number of the specific counter 105 is initially configured as zero.

In Step S204, the control circuit 104 compares the calculated polling rate with the currently used sensor frame rate. If the polling rate is higher than the currently used sensor frame rate, then the control circuit 104 in Step S205 is arranged to store or record the calculated polling rate and to reset the number of the specific counter 105 as zero. If the polling rate is not higher than the currently used sensor frame rate, then the control circuit 104 in Step S206 is arranged to compare the number of the specific counter 105 with the programmable threshold. If the number (i.e. the counting number) of specific counter 105 is not higher than the programmable threshold, then the flow goes back to Step S201, and the control circuit 104 is arranged to continuously monitor the event of signal reception of the polling request signal again. If the number of specific counter 105 is higher than the programmable threshold, then the flow proceeds to Step S205, and the control circuit 104 also stores or records the calculated polling rate and resets the number of the specific counter 105 as zero.

In Steps S201-S205, the control circuit 104 is arranged to monitor or detect whether a polling request signal is received. When receiving the polling request signal, the control circuit 104 can calculate a polling rate of the MCU 101 according to a time interval between the signal receptions of two polling request signals such as such received polling request signal and a previously received polling request signal (e.g. two consecutive polling request signals). Also, in this situation, the control circuit 104 increases the number of the specific counter 105 by one. Then, the control circuit 104 is arranged to store the calculated polling rate and reset the specific counter 105 as zero in response to an occurrence of an event that the calculated polling rate becomes higher than the currently used sensor frame rate and/or an occurrence of an event that the number of the specific counter 105 becomes higher than the programmable threshold. That is, when the calculated polling rate becomes higher than the currently used sensor frame rate, the control circuit 104 can instantly store the calculated polling rate and then determine whether adjust or maintain the sensor frame rate. Also, each time when a time interval associated with (or proportional to) the value or programmable threshold or the polling rate of MCU 101 ends, the control circuit 104 can store the calculated polling rate and then determine whether adjust or maintain the sensor frame rate. Accordingly, the control circuit 104 is capable of instantly adjusting the sensor frame rate and/or periodically adjusting the sensor frame rate based on a variable time interval which varies with the value or programmable threshold and/or the calculated polling rate of MCU 101.

In Steps S207-S212, after determining that the currently used sensor frame rate may be needed to be adjusted, the control circuit 104 is arranged to determine whether to adjust or maintain the sensor frame rate. In Step S207, the control circuit 104 compares the calculated polling rate with the sensor frame rate. If the calculated polling rate is higher than the sensor frame rate, the control circuit 104 in Step S208 is arranged to increase the sensor frame rate from the currently used frame rate to a higher frame rate which may be a slightly higher frame rate. Once the sensor frame rate is adjusted, the flow goes back to Step S201 and the control circuit 104 monitors the signal reception of a next polling request signal of the external MCU 101. Alternatively, if the calculated polling rate is not higher than the sensor frame rate, then control circuit 104 in Step S209 is arranged to determine whether the calculated polling rate is lower than the sensor frame rate. If the calculated polling rate is not higher and not lower than the sensor frame rate, this indicates that the calculated polling rate is equal to the sensor frame rate, and the control circuit 104 in Step S211 is arranged to maintain the currently used sensor frame rate without adjusting the frame rate. Once the sensor frame rate is adjusted, the flow goes back to Step S201 and the control circuit 104 monitors the signal reception of a next polling request signal of the external MCU 101. If the calculated polling rate is lower than the sensor frame rate, then the control circuit 104 in Step S210 is arranged to compare the calculated polling rate with a lower frame rate (or slightly lower frame rate) to be adjusted. If the calculated polling rate is lower than the lower frame rate to be adjusted, then this indicates that the MCU's 101 polling rate becomes significantly lower, and the control circuit 104 in Step S212 is arranged to decrease the currently used sensor frame rate from the currently used frame rate to the lower frame rate which is higher than the MCU's 101 polling rate. If the calculated polling rate is not lower than the lower frame rate to be adjusted, then the control circuit 104 in Step S211 is arranged to maintain the sensor frame rate to make the currently used frame rate be higher than the MCU's 101 polling rate.

By doing so, the control circuit 104 can control the sensor frame rate at a frame rate which is slightly higher than the polling rate of the MCU 101 even though the polling rate of MCU 101 may has deviation(s), so that the navigation sensor circuit 102 can save more power if the polling rate becomes slower and avoid reporting two or more displacement data to the MCU 101 between two neighboring/consecutive polling request events of the MCU 101. Also, this can achieve the minimum requirement of the MCU's 101 polling rate. The navigation sensor circuit 102 can instantly increase the sensor frame rate once the polling rate becomes higher than the currently used frame rate and can slowly decrease the sensor frame rate only when it ensures that a significant drop of the polling rate occurs. Thus, the minimum frame rate used by the image sensor 103 can be kept at a frame rate which is slightly higher than the MCU's 101 polling rate.

Figure 3:
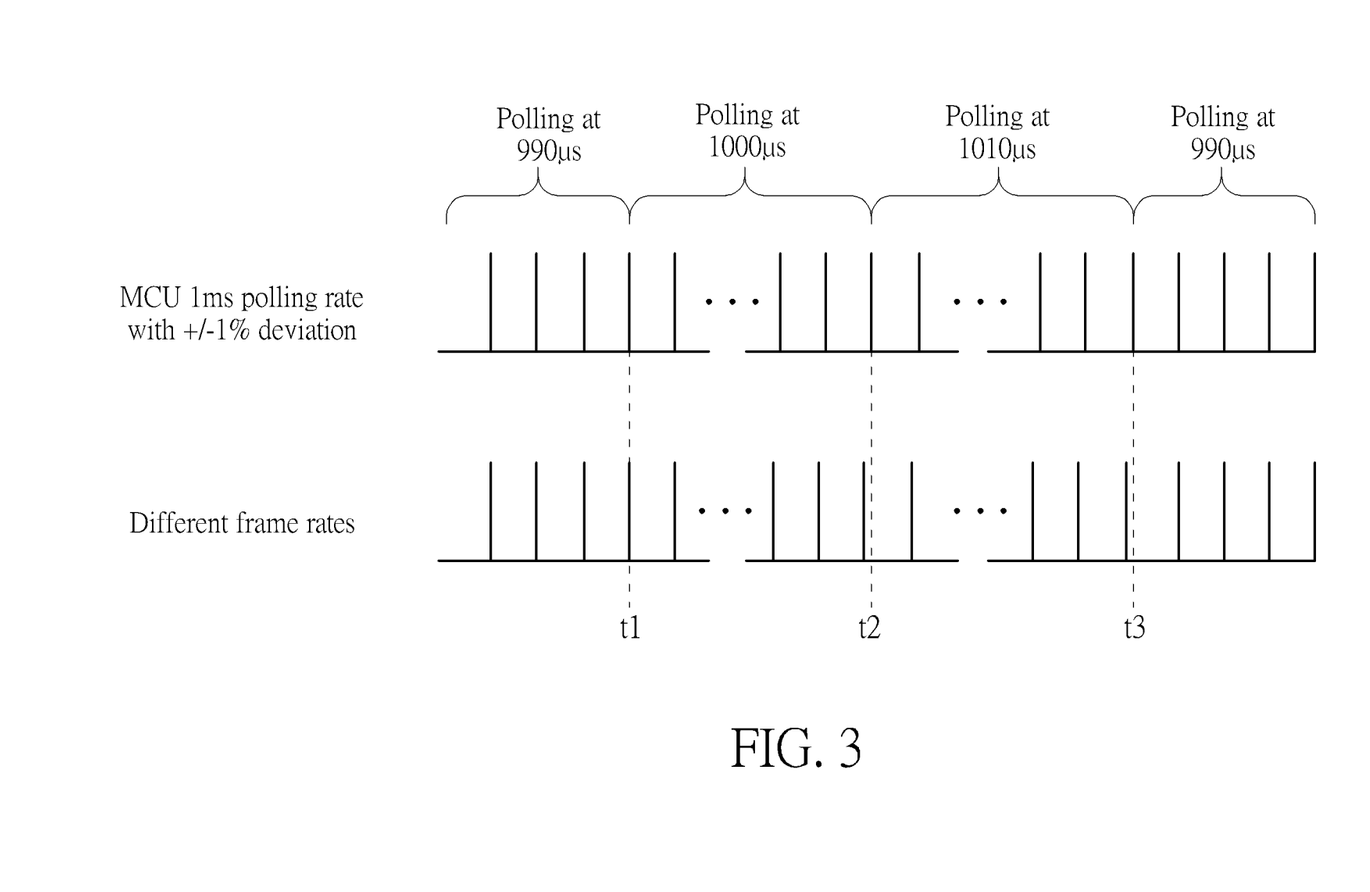
FIG. 3 is a diagram of a first scenario example of the operations of the MCU and navigation sensor circuit according to an embodiment of the invention.

FIG. 3 is a diagram of a first scenario example of the operations of the MCU 101 and navigation sensor circuit 102 according to an embodiment of the invention. As shown in FIG. 3, the MCU 101 ideally is arranged to periodically send polling request events/signals at the period of 1000 μs. That is, the MCU's 101 ideal polling rate is 1 KHz (but not limited). However, actually the MCU's 101 polling rate may have a deviation range of one percent (i.e. +/−1%); this is not intended to be a limitation. That is, in this example, the time interval between two consecutive polling request events may vary within a range between 990 μs and 1010 μs. For example, due to the deviation, the MCU 101 may send the polling request events/signals at different periods of 990 μs, 1000 μs, 1010 μs, and 990 μs respectively in different conditions, as shown in FIG. 3. The navigation sensor circuit 102 can control its sensor frame rate be slightly higher than the currently used polling rate of the MCU 101 to track the change of the currently used polling rate; equivalently, the navigation sensor circuit 102 can control the corresponding period of the sensor frame rate be slightly shorter than the period of the currently used polling rate. For example, if the polling rate becomes slower at time t1, e.g. the period of polling rate changes from 990 μs to 1000 μs, then the control circuit 104 can control the sensor frame rate downshifting to a slower frame rate when the counting number of specific counter 105 becomes higher than the programmable threshold. When the polling rate becomes much slower at time t2, e.g. the period of polling rate changes from 1000 μs to 1010 μs, then the control circuit 104 can control the sensor frame rate downshifting to a much slower frame rate again when the counting number of specific counter 105 becomes higher than the programmable threshold. When the polling rate becomes faster at time t3, e.g. the period of polling rate changes from 1010 μs to 990 μs, then the control circuit 104 can control the sensor frame rate upshifting to a higher frame rate again when detecting the faster polling rate.

Figure 4:
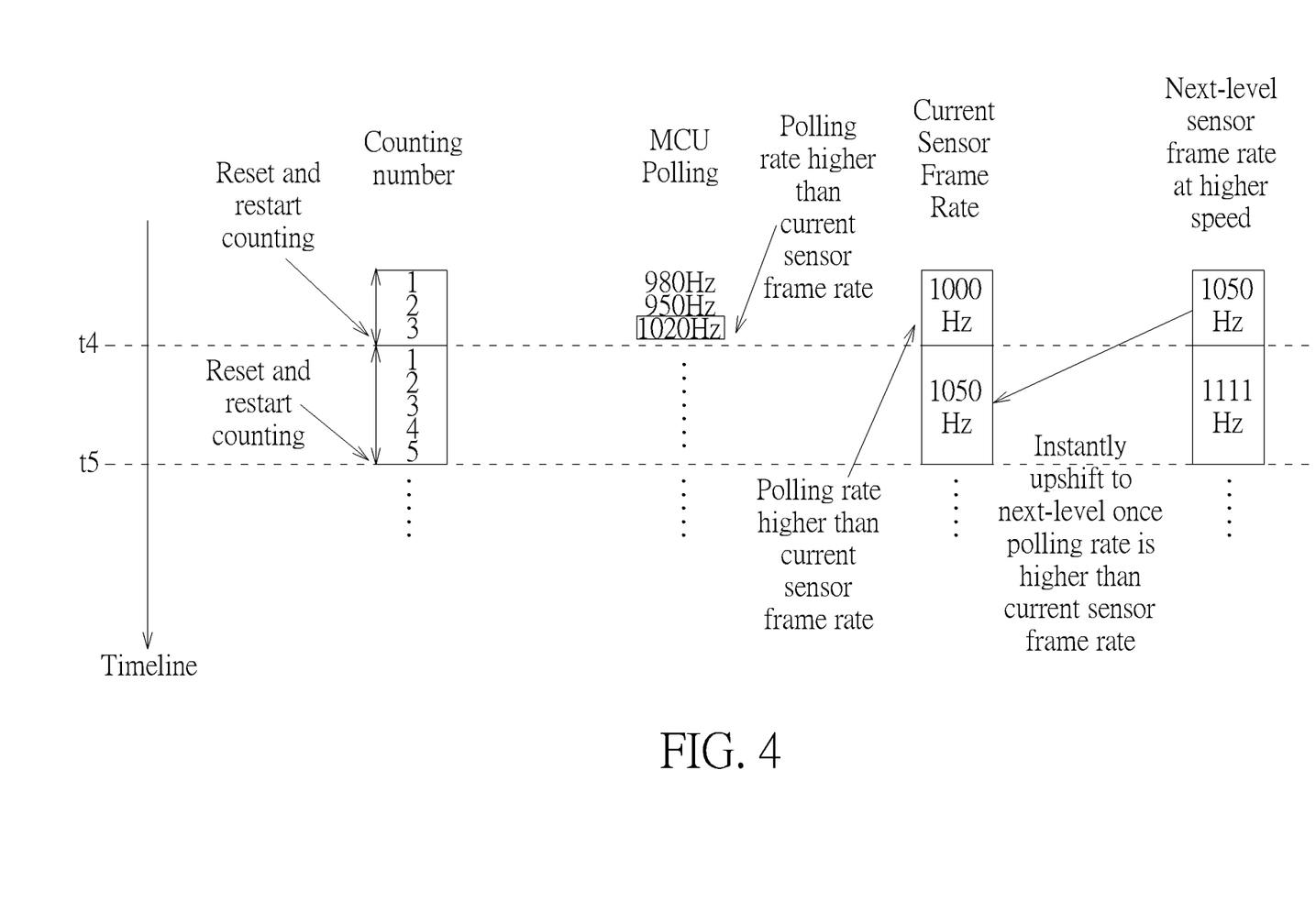
FIG. 4 is a diagram of a second scenario example of the operations of the MCU and navigation sensor circuit according to an embodiment of the invention.

FIG. 4 is a diagram of a second scenario example of the operations of the MCU 101 and navigation sensor circuit 102 according to an embodiment of the invention. The programmable threshold may be configured as 4 (but not limited). Thus, when the counting number of the specific counter 105 counts to 5, the specific counter 105 will be reset. In the example of FIG. 4, at time t4, the specific counter 105 counts to 3, and the MCU's 101 polling rate changes to 1020 Hz and becomes higher than the currently used sensor frame rate such as 1000 Hz; the currently used sensor frame rate means a current sensor frame rate which represents the frame rate that the image sensor 103 is running now. In this situation, the control circuit 104 can instantly increase the sensor frame rate from 1000 Hz to 1050 Hz (e.g. the next higher level of frame rate). From time t4 to time t5, the MCU's 101 polling rate for example does not change, and the counting number of specific counter 105 is higher than the programmable threshold, i.e. 4, at time t5. The sensor frame rate is kept at 1050 Hz, and the control circuit 104 is arranged to determine whether to increase, decrease, or maintain the sensor frame rate. During the time interval from time t4 to time t5, the MCU's 101 polling rate stays at 1020 Hz, and the sensor frame rate dose not downshift to a lower frame rate since the next-level slower frame rate is equal to 1000 Hz which is lower than 1020 Hz and does not fit the requirements to downshift. It should be noted that a polling rate, lower than the current sensor frame rate, may be higher than, equal to, or lower than the next-level slower frame rate, and thus the control circuit 104 may increase, decrease, or maintain the sensor frame rate based on different conditions.

Figure 5:
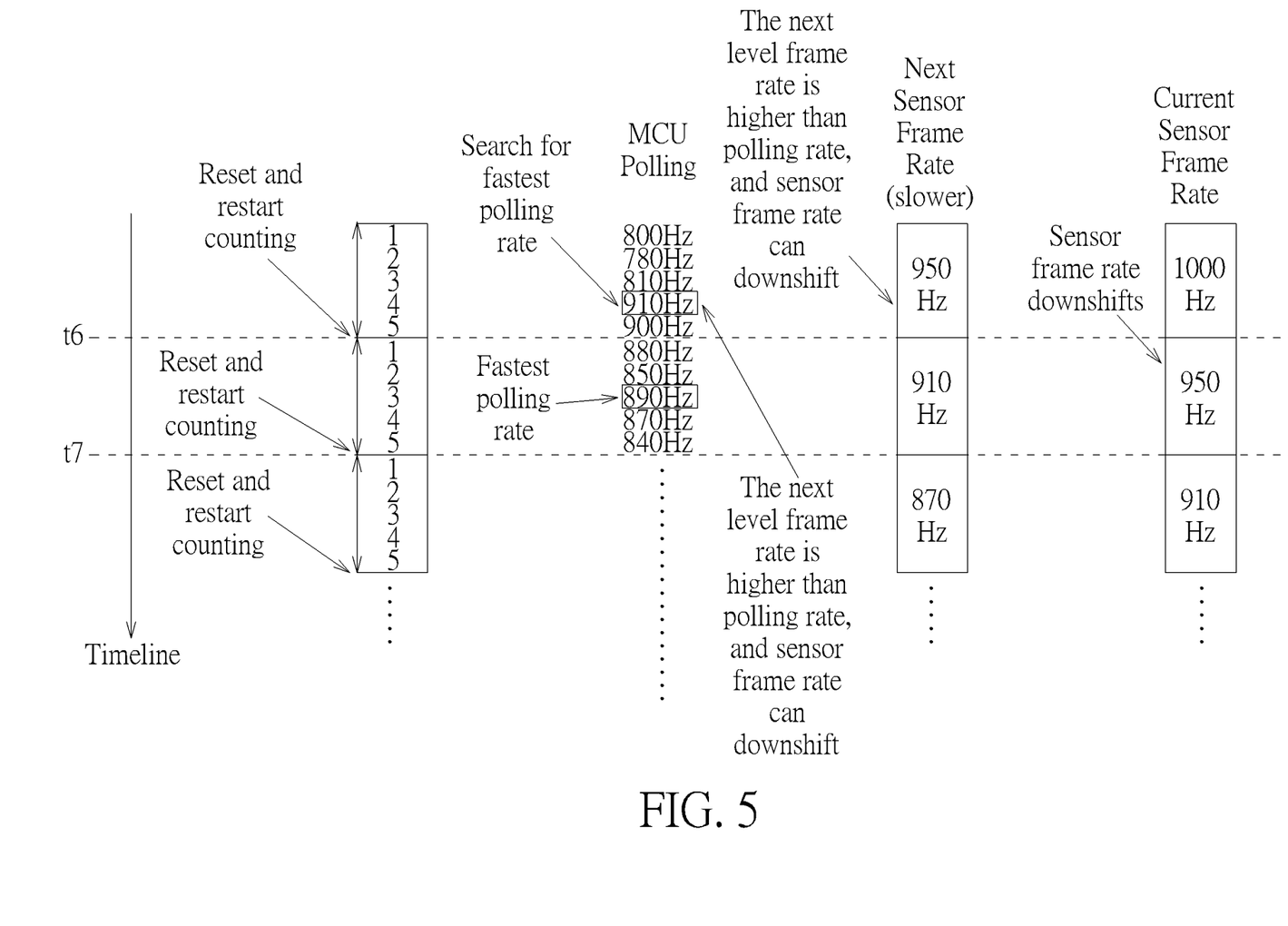
FIG. 5 is a diagram of a third scenario example of the operations of the MCU and navigation sensor circuit according to another embodiment of the invention.

FIG. 5 is a diagram of a third scenario example of the operations of the MCU 101 and navigation sensor circuit 102 according to another embodiment of the invention. As shown in FIG. 5, the current sensor frame rate is kept at 1000 Hz originally, and the slightly lower level of the sensor frame rate, i.e. the next-level slower frame rate, is equal to 950 Hz. The MCU's 101 polling rate may change and may be at 800 Hz, 780 Hz, 810 Hz, 910 Hz, and 900 Hz sequentially before time t6. Since none of the above mentioned rates is higher than the currently used sensor frame rate (i.e. 1000 Hz), the specific counter 105 will continuously count and becomes larger than the programmable threshold, i.e. 4, at time t6. In this situation, the control circuit 104 is arranged to allow the sensor frame rate downshifting to a slightly lower frame rate (i.e. the next-level slower frame rate) if the next-level slower frame rate is still running faster than a maximum polling rate. In practice, the control circuit 104 can search for the maximum/fastest polling rate among the polling rates corresponding to a time interval specified by the specific counter 105's start and stop (i.e. reset). For example, the control circuit 104 can select 910 Hz as the maximum/fastest polling rate and changes the sensor frame rate from 1000 Hz to 950 Hz since now the changed sensor frame rate 950 Hz is still higher than the maximum/fastest polling rate 910 Hz. From time t6 to time t7, the sensor frame rate is kept at 950 Hz since the polling rate does not become higher than 950 Hz and the next-level slower frame rate now is set as 910 Hz. Similarly, the MCU's 101 polling rate may change and may be at 880 Hz, 850 Hz, 890 Hz, 870 Hz, and 840 Hz sequentially from time t6 to time t7. Also, since none of the above mentioned rates is higher than the currently used sensor frame rate (i.e. 950 Hz), the specific counter 105 will continuously count and stop (i.e. reset) at time t7. In this situation, the control circuit 104 is arranged to allow to downshift the current sensor frame rate to another slightly lower frame rate (i.e. another next-level slower frame rate such as 910 Hz) if such another next-level slower frame rate is still running faster than the maximum polling rate (e.g. 890 Hz). In practice, the control circuit 104 can search for a maximum/fastest polling rate among the polling rates corresponding to a time interval specified by the specific counter 105's start and stop (i.e. reset). For example, the control circuit 104 can select 890 Hz and changes the sensor frame rate from 950 Hz to 910 Hz, and the image sensor 103 operates at the frame rate of 910 Hz after time t7.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of a navigation sensor circuit, comprising:
   monitoring at least one polling request signal sent from a microcontroller during a variable time interval, wherein the microcontroller is externally coupled to the navigation sensor circuit;
   calculating at least one polling rate of the microcontroller according to the at least one polling request signal; and
   dynamically adjusting a sensor frame rate of the navigation sensor circuit according the at least one polling rate, wherein an image sensor of the navigation sensor circuit operates and captures images to generate and output displacement data based on the sensor frame rate;
   wherein a time length of the variable time interval is proportional to a programmable threshold, and a specific counter is used to count a number of signal receptions of the at least one polling request signal and is reset when a counting number of the specific counter is higher than the programmable threshold.

2. The method of claim 1, further comprising:
   instantly adjusting the sensor frame rate from a currently used frame rate to a higher frame rate to make the sensor frame rate be higher than the at least one polling rate when the at least one polling rate becomes higher than the currently used frame rate.

3. The method of claim 1, wherein a time length of the variable time interval becomes shorter when the at least one polling rate becomes higher.

4. The method of claim 1, further comprising:
   adjusting the sensor frame rate from a currently used frame rate to a lower frame rate which is lower than the currently used frame rate and higher than the at least one polling rate when the counting number of the specific counter is higher than the programmable threshold; and
   not adjusting the sensor frame rate when the counting number is not higher than the programmable threshold.

5. The method of claim 1, further comprising:
   maintaining the sensor frame rate when both events of the sensor frame rate being higher than the at least one polling rate and a difference between the sensor frame rate and the at least one polling rate being smaller than a specific threshold.

6. The method of claim 1, further comprising:
   adjusting the sensor frame rate by configuring the sensor frame rate as a maximum polling rate among the at least one polling rate when the counting number of the specific counter becomes higher than the programmable threshold.

7. The method of claim 1, further comprising:
   determining whether to decrease or maintain the sensor frame rate only when the variable time interval ends.

8. A navigation sensor circuit to be externally coupled to a microcontroller, comprising:
   an image sensor, for operating and capturing images to generate and output displacement data based on a sensor frame rate;
   a specific counter; and
   a control circuit, coupled to the image sensor and the specific counter, for:
      monitoring at least one polling request signal sent from the microcontroller during a variable time interval;

calculating at least one polling rate of the microcontroller according to the at least one polling request signal; and dynamically adjusting the sensor frame rate according the at least one polling rate;

wherein a time length of the variable time interval is proportional to a programmable threshold, and the specific counter is started by the control circuit to count a number of signal receptions of the at least one polling request signal and is reset by the control circuit when a counting number of the specific counter is higher than the programmable threshold.

9. The navigation sensor circuit of claim 8, wherein the control circuit is arranged for:

instantly adjusting the sensor frame rate from a currently used frame rate to a higher frame rate to make the sensor frame rate be higher than the at least one polling rate when the at least one polling rate becomes higher than the currently used frame rate.

10. The navigation sensor circuit of claim 8, wherein a time length of the variable time interval becomes shorter when the at least one polling rate becomes higher.

11. The navigation sensor circuit of claim 8, wherein the control circuit is arranged for:

adjusting the sensor frame rate from a currently used frame rate to a lower frame rate which is lower than the currently used frame rate and higher than the at least one polling rate when the counting number of the specific counter is higher than the programmable threshold; and not adjusting the sensor frame rate when the counting number is not higher than the programmable threshold.

12. The navigation sensor circuit of claim 8, wherein the control circuit is arranged for:

maintaining the sensor frame rate when both events of the sensor frame rate being higher than the at least one polling rate and a difference between the sensor frame rate and the at least one polling rate being smaller than a specific threshold.

13. The navigation sensor circuit of claim 8, wherein the control circuit is arranged for:

adjusting the sensor frame rate by configuring the sensor frame rate as a maximum polling rate among the at least one polling rate when the counting number of the specific counter becomes higher than the programmable threshold.

14. The navigation sensor circuit of claim 8, wherein the control circuit is arranged for:

determining whether to decrease or maintain the sensor frame rate only when the variable time interval ends.

* * * * *